United States Patent
Wu

(10) Patent No.: US 6,220,398 B1
(45) Date of Patent: Apr. 24, 2001

(54) BRAKE CABLE POSITIONING ASSEMBLY FOR AN INNER SWIVEL CONNECTOR OF A FREE STYLE BICYCLE

(76) Inventor: Chin-Chang Wu, No. 5, Alley 28, Lane 108, Yungfeng Rd., Taiping City, Taichung Hsien (TW)

( * ) Notice: Subject to any disclaimer, the term of this patent is extended or adjusted under 35 U.S.C. 154(b) by 0 days.

(21) Appl. No.: 09/431,701

(22) Filed: Nov. 1, 1999

(51) Int. Cl.$^7$ ....................................... B62L 1/00
(52) U.S. Cl. .................. 188/24.11; 188/2 D; 74/551.1; 74/502.6
(58) Field of Search .............................. 188/24.21, 24.11, 188/24.22, 2 D; 74/551.1, 551.8, 502.4, 502.6, 501.5 R; 280/279, 280

(56) References Cited

U.S. PATENT DOCUMENTS

| | | | |
|---|---|---|---|
| 4,753,448 | * 6/1988 | Nagashima | 188/24.22 X |
| 5,505,105 | * 4/1996 | Kuo | 74/502.4 |
| 5,605,076 | * 2/1997 | Wu | 74/551.1 |
| 5,732,601 | * 3/1998 | Wu | 74/502.4 |

* cited by examiner

Primary Examiner—Robert J. Oberleitner
Assistant Examiner—Pamela J. Rodriguez
(74) Attorney, Agent, or Firm—Kolisch Hartwell Dickinson McCormack & Heuser

(57) ABSTRACT

The brake cable positioning assembly in accordance with the present invention contains a mounting element for connecting the handlebar clamp with the fork shaft. The mounting element has a lug inserted into the slit extending between the inner periphery of the bore for clamping the fork shaft and the edge of the handlebar clamp. The mounting element further has a hollow sleeve to receive the brake cable fitting. With the assembly disclosed, the brake cable can travel to the inner swivel connector through the slit without penetrating the shank of the handlebar.

3 Claims, 4 Drawing Sheets

BRAKE CABLE POSITIONING ASSEMBLY FOR AN INNER SWIVEL CONNECTOR OF A FREE STYLE BICYCLE

BACKGROUND OF THE INVENTION

1. Field of the Invention

The present invention relates to a brake cable positioning assembly for an inner swivel connector of a free style bicycle, especially to a brake cable positioning assembly capable of conveniently and exactly positioning the brake cables between the handlebar grip and the inner swivel connector.

2. Description of Related Art

A swivel connector is mound around the fork shaft of a free style bicycle and is used to connect the brake cables between the handlebar grip and the rear brake to allow 360° revolution of the handlebar without wrapping the brake cables around the fork shaft and the frame. The swivel connector is usually mounted around the outer periphery of the fork shaft. The problem of surface corrosion of the swivel connector occurs due to environmental factors such as oxidation, moisture in the air or acid rain. A proposal for resolving the problem of corrosion of the swivel connector is to provide an inner swivel connector inside the head tube, for example the inner connector as shown in FIG. 4.

With reference to FIG. 4, a swivel connector 50 is rotatably mounted around the tubular fork shaft 41 with one end connected to the front fork 40 and the other end inserted into the handlebar clamp 20. The head tube 30 is mounted between the front fork 40 and the handlebar clamp 20 over the swivel connector 50. The upper head set 31 is further provided between the handlebar clamp 20 and the head tube 30 to facilitate the rotation of the handlebar clamp 20. In order to connect the brake cable 51 from the handle grip (not shown) to the inner connector 50, the shank 201 extending between the two bores (one for receiving the handlebar and the other for receiving the fork tube) on the handlebar clamp 20 is drilled to form a cable 51 passage. The head set 31 is also drilled to receive the cable 51. Since the shank 201 is very thick and the head set 31 should be punctured such that the puncture on the clamp 20 aligns with that on the head set 31, a new problem regarding fabrication and assembly time and cost arises with the device as shown in the prior art.

Therefore, there is a need for a brake cable positioning assembly capable of conveniently and exactly positioning the brake cable between the handlebar grip and the inner swivel connector.

SUMMARY OF THE INVENTION

The objective of the present invention is to provide a brake cable positioning assembly for an inner swivel connector on a free style bicycle, which can conveniently and exactly position the brake cable between the handlebar grip and the inner swivel.

To achieve the objective, the brake cable positioning assembly in accordance with the present invention contains a mounting element for connecting the handlebar clamp with the fork shaft. The mounting element has a lug inserted into the slit extending between the periphery of the bore for clamping the fork shaft and the edge of the handlebar clamp. The mounting element further has a sleeve to receive the brake cable fitting. With the assembly disclosed, the brake cable can travel to the inner swivel connector through the slit without penetrating the shank of the handlebar clamp.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
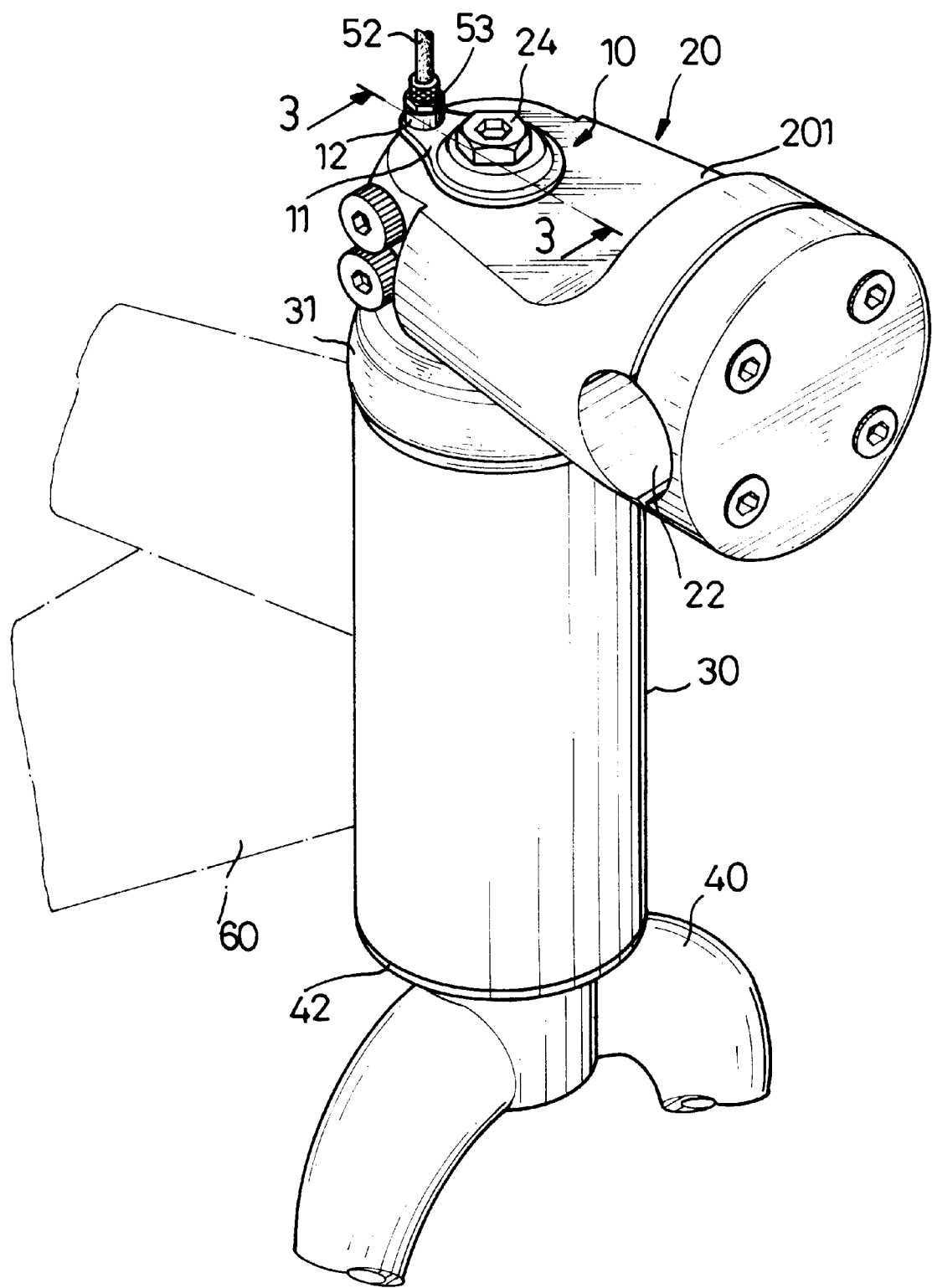
FIG. 1 is a perspective view of the brake cable positioning assembly for an inner swivel connector mounted on a free style bicycle in accordance with the present invention.
Figure 2:
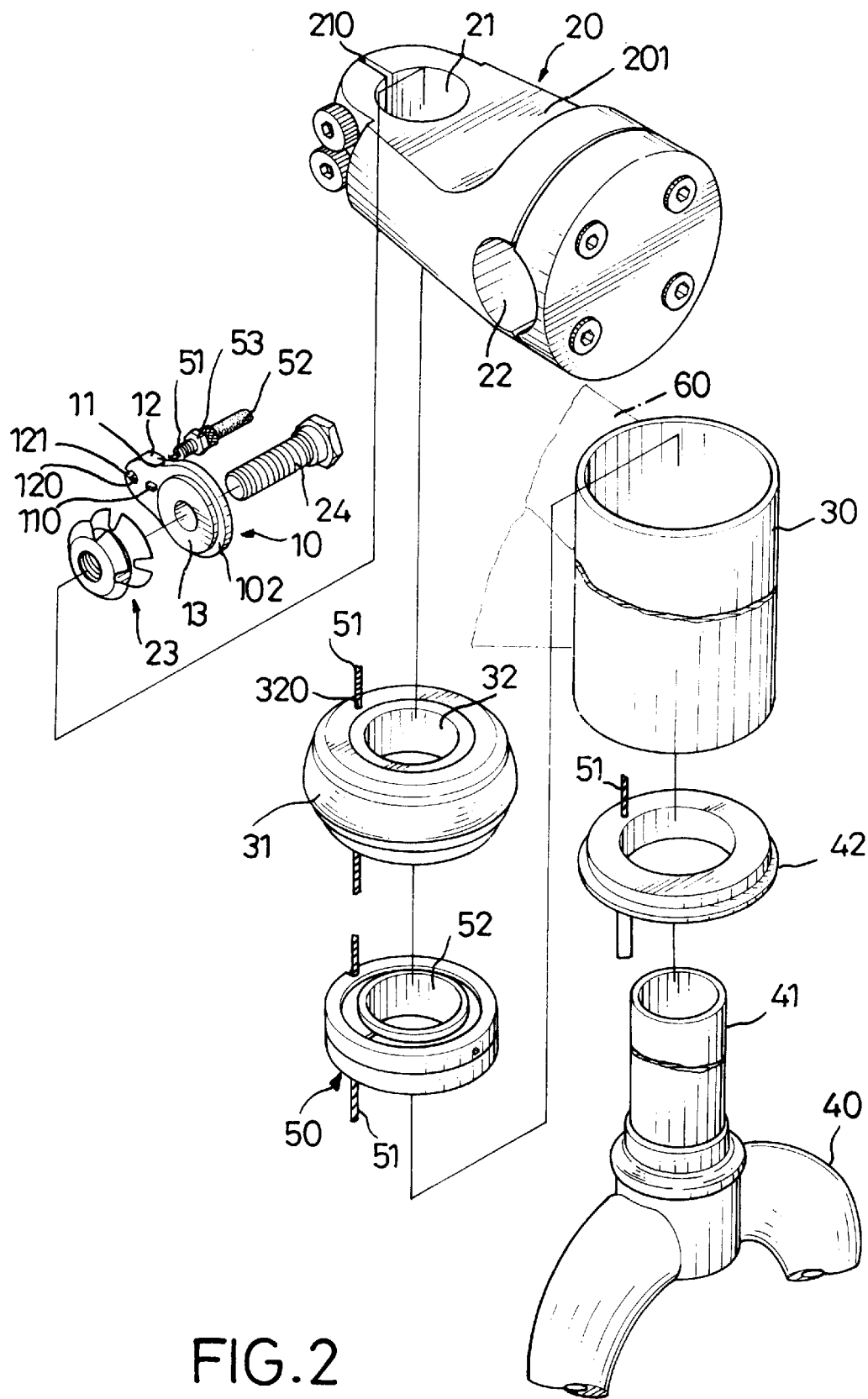
FIG. 2 is exploded perspective view of the brake cable positioning assembly FIG. 1.
Figure 3:
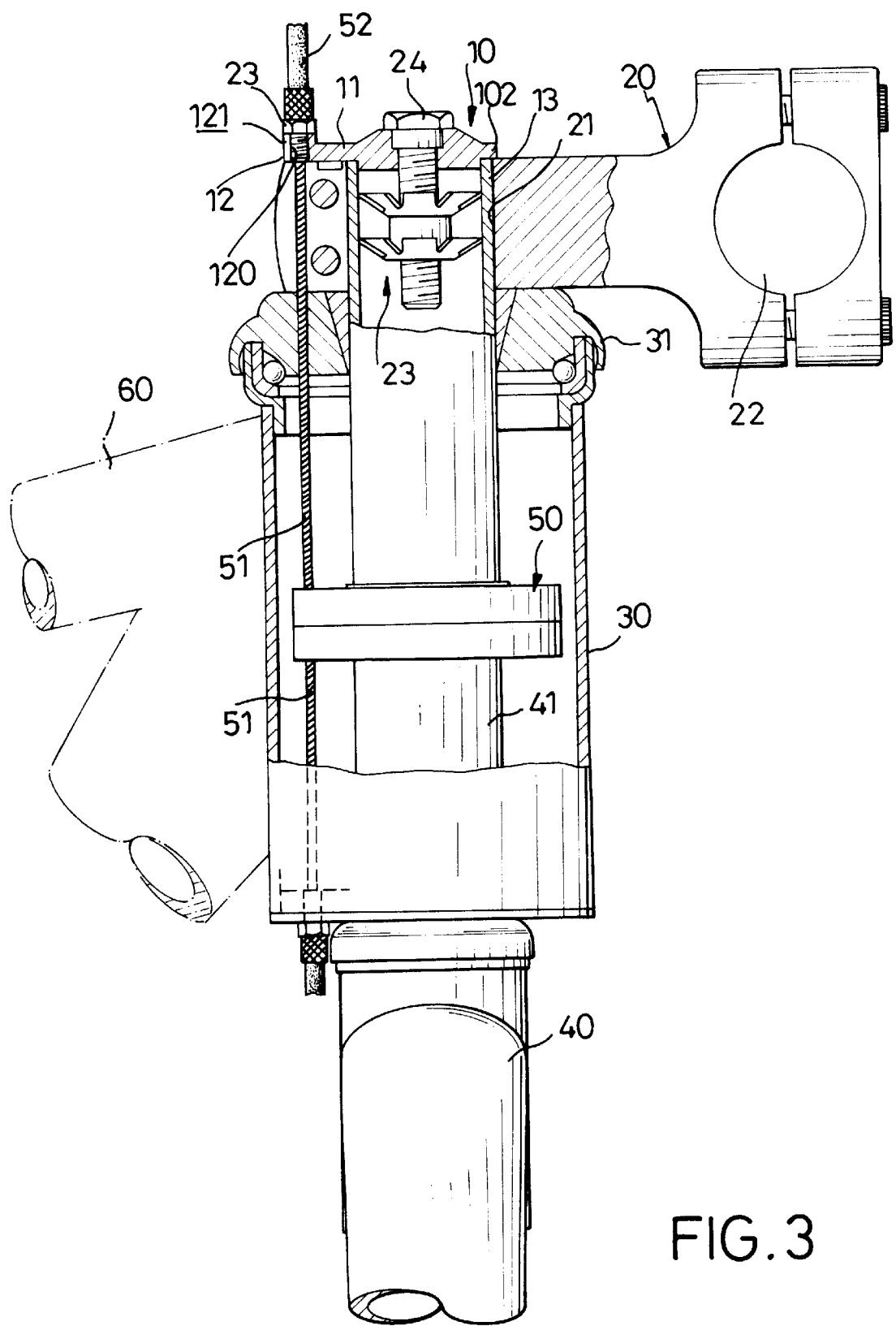
FIG. 3 is a side plain view in partial section along line 3—3 in FIG. 1.
Figure 4:
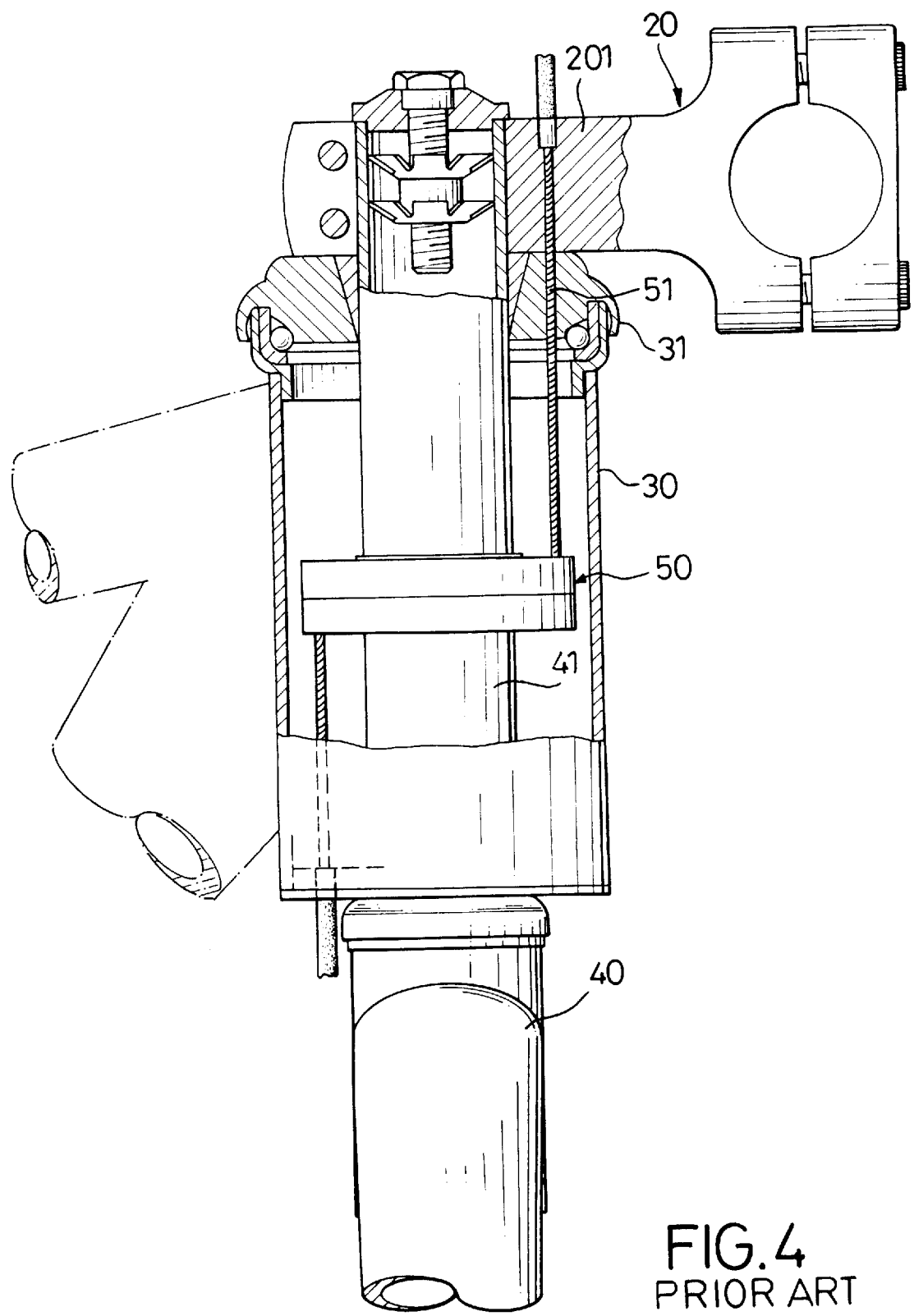
FIG. 4 is a side plain view in partial section of a brake cable positioning assembly in accordance with the prior art.

With reference to FIGS. 1, 2 and 3, the brake cable positioning assembly for an inner swivel connector in accordance with the present invention is mounted on the tubular fork shaft 41 of the front fork 40 of a free style bicycle. The brake cable positioning assembly comprises a handlebar clamp 20, a mounting element 10, an upper head set 31, an inner swivel connector 50, a head tube 30 and a lower head set 42.

The handlebar clamp 20 can be a traditional handlebar clamp having a clamping bore 22 for receiving the handlebar (not shown) and a clamping bore 21 for co-axially receiving the fork shaft 41. The handlebar clamp 20 further has a slit 210 extending from the periphery of the clamping bore 21 to the edge of the handlebar clamp 20.

The mounting element 10 is mounted in the end of the fork shaft (41 ) in the bore (21) in the handlebar clamp 20. The mounting element 10 has a collar protrusion 13 and a flange 102 extending around the collar protrusion 13. The collar protrusion 13 co-axially extends into the fork shaft 41 received in the bore 21. The collar protrusion 13 has a central through hole (unnumbered) so that a bolt 24 can be inserted through the collar protrusion 13 to screw into a locking nut 23. The mounting element 10 further has an ear 11 horizontally extending from the flange 102 along the slit 210. The ear 11 further has a lug 110 extending toward the slit 21 and defined between the sleeve 12 and the collar protrusion 13 so that the lug 110 can be inserted into the slit 201. A sleeve 12 integrally extends upward from the end of the ear 11 so that the sleeve 12 can communicate with the slit 21. The sleeve 12 defines a threaded hole 120 on the inner periphery thereof, and a cable fitting 53 such as a tubular bolt can screw into the threaded hole 120. The cable fitting 53 is connected to a cable sheath 52 containing a brake cable 51. A gap 121 is further defined along the wall of the sleeve 12 to communicate with the slit 21. The gap 121 and the slit 210 allow the passage of the cable 51 when the fitting 53 is screwed into the threaded hole 120.

The upper head set 31 is mounted under the clamp 20 and has a bore 32 aligning with the fork shaft 41 bore 21 in the handlebar clamp 20 so that the fork shaft 41 can extend through the bore 32. The upper head set 31 can be a traditional head set 31 except that the upper head set 31 further has an aperture 320 so that the brake cable 51 can be inserted through the aperture 320.

The inner swivel connector 50 can be a traditional connector having two coupling parts each connected to a cable 51 from the handle grip and another from the brake (not shown). The inner swivel connector 50 has a bore 52 to co-axially receive the fork shaft 41. With the inner swivel connector 50, the free style bicycle handlebar can revolve about 360° without tangling the cable 51 on the frame 60 or the fork 40.

The lower head set 42 is similar to the upper head set 31 in configuration and is provided below the inner swivel connector 50.

The head tube 30 is provided to conventionally connect the bicycle head (handlebar and the front wheel) with the bicycle frame 60. For the purpose of the present invention, the diameter of the head tube 30 is suitably enlarged so that it will cover the inner swivel connector 50 when it is between the upper and the lower head set 31, 42.

With the brake cable positioning assembly in accordance with the present invention, the inner swivel connector 50 is received in the head tube 30 to avoid surface corrosion of the connector 50. In addition, since the shank 201 does not need to be penetrated, both the assembly and fabrication time and the manufacturing cost will be lowered. The brake cable 51 extending from the handlebar grip to the inner swivel connector 50 can be conveniently and exactly positioned.

Although the present invention has been explained relative to its preferred embodiment, it is to be understood that many other possible modifications and variations can be made without departing from the spirit and scope of the invention as hereinafter claimed.

What is claimed is:

1. A brake cable positioning assembly for an inner swivel connector of a free style bicycle mounted on a tubular fork shaft of said bicycle, comprising:

a handlebar clamp having a bore for receiving the fork shaft and a bore for receiving the handlebar, said bore for receiving the fork shaft defining a slit extending from the inner periphery of said bore to the edge of the clamp;

a mounting element, mounted on the clamp to cover the bore for receiving the shaft and the slit, having a collar protrusion co-axially extending into the fork shaft and a flange surrounding the collar protrusion with an ear extending from the flange along the slit, wherein the ear has a lug extending toward and into the slit and a sleeve extending upward from the end of the ear to receive the brake cable;

an upper head set co-axially mounted on the fork shaft under the handlebar clamp and having an aperture to receive the brake cable;

an inner swivel connector co-axially located on the fork shaft below the upper head set;

a lower head set co-axially mounted on the fork shaft below the inner swivel and having an aperture to receive the brake cable; and a head tube mounted between the upper and the lower head sets to receive the inner swivel.

2. The brake cable positioning assembly as claimed in claim 1, wherein a brake cable sheath with a brake cable fitting for receiving the brake cable is further provided and the brake cable fitting is mounted in the sleeve of the mounting element.

3. The brake cable positioning assembly as claimed in claim 2, wherein the brake cable fitting is a tubular bolt and the inner periphery of the sleeve is further threaded so that the brake cable fitting can screw into the sleeve.

* * * * *